United States Patent [19]

Yargici

[11] 4,305,627
[45] Dec. 15, 1981

[54] BEARING HOUSING AND LUBRICATION STRUCTURE FOR CONCENTRIC ROTATING MEMBERS

[75] Inventor: Zekeriya Yargici, Roseville, Minn.

[73] Assignee: American Hoist & Derrick Company, St. Paul, Minn.

[21] Appl. No.: 152,683

[22] Filed: May 23, 1980

[51] Int. Cl.³ .......................... F16C 33/66; F16N 7/26
[52] U.S. Cl. ..................................... 308/187; 180/20; 184/11 A
[58] Field of Search ............... 308/109, 110, 116, 117, 308/127, 187, 207 R; 184/11 A; 180/20

[56] References Cited

U.S. PATENT DOCUMENTS

| | | | |
|---|---|---|---|
| 1,787,428 | 1/1931 | Fekete et al. | 308/127 |
| 2,645,535 | 7/1953 | Bartch et al. | 308/117 |
| 3,741,343 | 6/1973 | Lindenfeld et al. | 184/11 A |
| 3,987,873 | 10/1976 | Ruberte | 184/11 A |
| 4,201,493 | 5/1980 | Braum | 180/20 |
| 4,230,379 | 10/1980 | Edström | 308/187 |

Primary Examiner—Richard R. Stearns
Attorney, Agent, or Firm—Kinney, Lange, Braddock, Westman and Fairbairn

[57] ABSTRACT

An earth compacting machine includes a hollow drum rotatably mounted at each end to the machine frame to rotate on a horizontal axis, and a concentric vibratory shaft rotatably mounted at each end in a bearing which is mounted in a bearing housing fixedly mounted to the drum. A cylindrical oil sump mounted to rotate with the drum, surrounds the vibratory shaft and shaft bearings and encompasses the bearing housings. Lubrication oil in the sump covers a lower portion of the bearing housings but is below the lowest level reached by the vibratory shaft and its offset weight. Each bearing housing has a plurality of pockets provided therein open through oil access ports to the oil sump and through oil delivery ports to its associated bearing. Oil flows into a pocket when its oil access port is below the level of oil in the sump; and flows out of the pocket as the oil delivery port approaches and pass over the axis of horizontal rotation.

7 Claims, 5 Drawing Figures

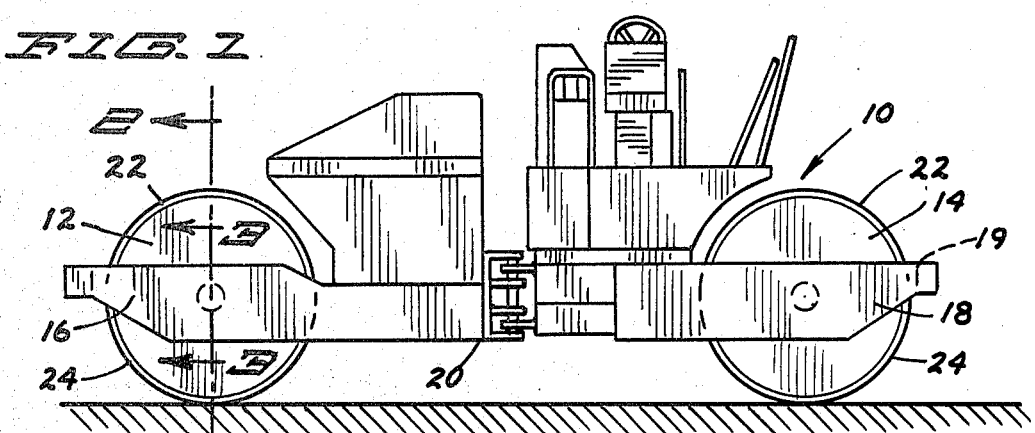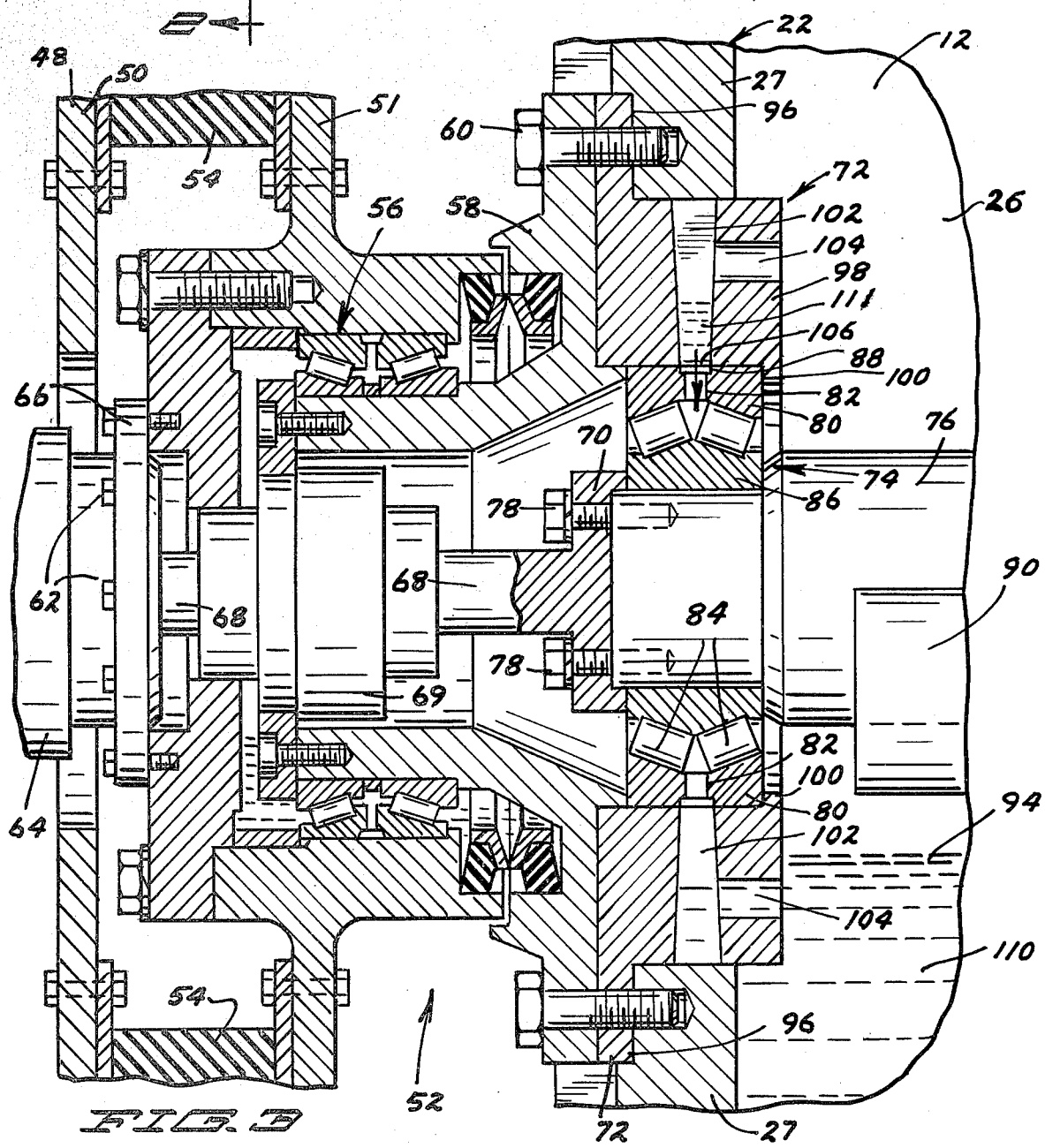

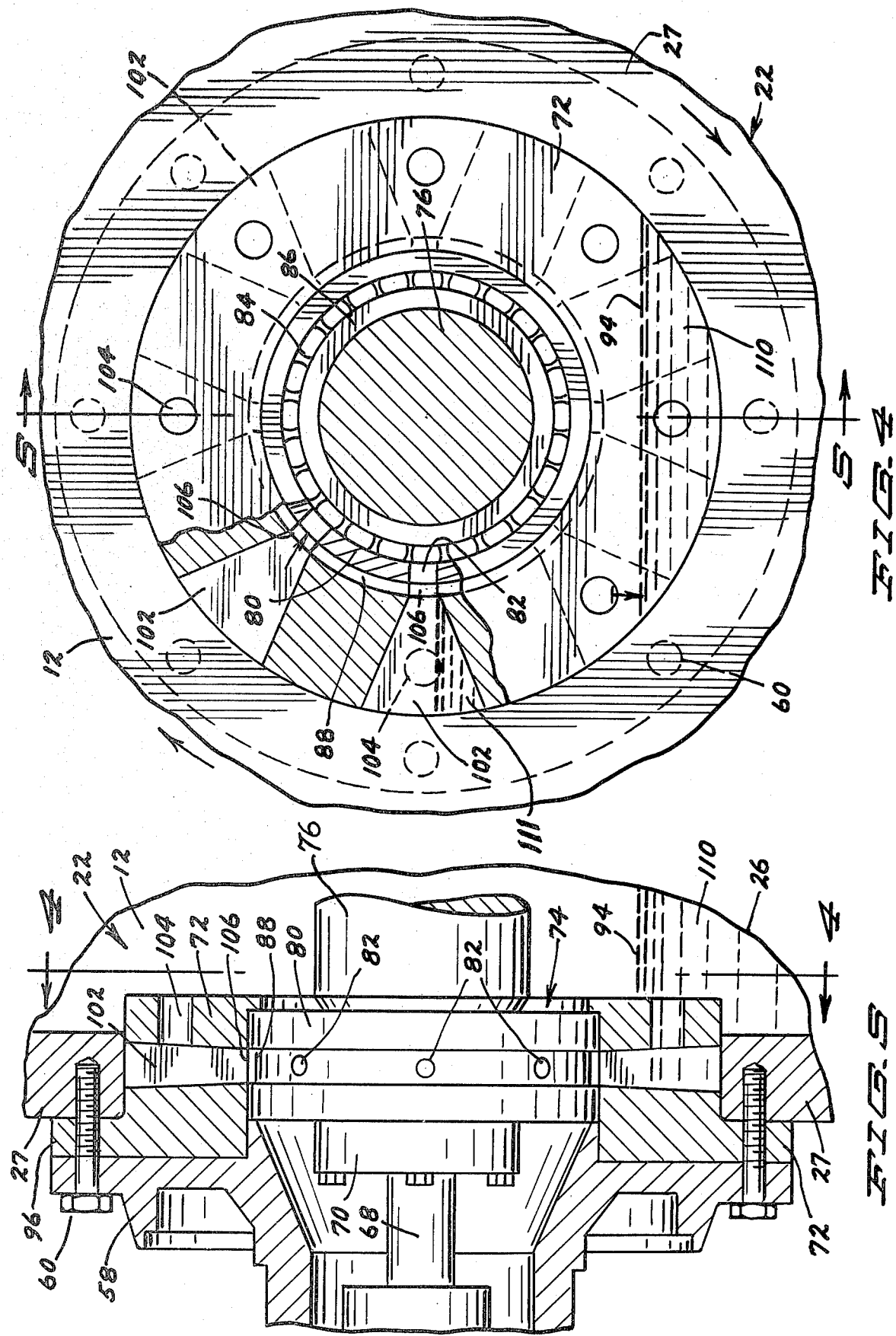

BEARING HOUSING AND LUBRICATION STRUCTURE FOR CONCENTRIC ROTATING MEMBERS

BACKGROUND OF THE INVENTION

This invention has relation to the positive lubrication of bearings in structures where the bearing supports a shaft adapted to be rotated at relatively high speeds while the bearing is supported in a housing which is adapted to turn at a relatively low speed. The structure of the invention will be particularly useful in connection with the positive lubrication of a bearing supporting a vibratory shaft for concentric rotation with respect to a road roller or drum forming part of a road, earth or other surface compacting machine, the bearing being supported to rotate with the drum.

It has been common practice to use a slinger ring attached around a rotating part to dip into an oil sump and to thereby spray oil off the periphery of the ring creating an oily atmosphere to lubricate the bearings. This method generates considerable heat which represents wasted energy, and the total flow of the lubricating oil is not directed to the bearings. Instead a small part of the flow is expected to find its way into the bearings. This is not real positive lubrication. Also, in the case of a vibratory road roller or earth compacting machine, the vibratory shaft is not always turning when the machine is moving, and so the bearings supporting the vibratory shaft would get no fresh supply of oil from slinger rings during that time.

Another method used is to grease the bearings. However, it is desirable to rotate the vibratory shaft at speeds up to 2300 revolutions per minute (rpm), but rotational speeds of over 1800 rpm's are not practical using grease, as the lubricative film afforded by the grease breaks down at higher speeds.

The need for effective lubrication can be lessened by increasing the diameter of the bearing to obtain more load bearing surface. To reach the speeds necessary for effective operation of the vibratory shaft, however, the additional forces involved due to the larger diameter of the moving parts are such as to tend to destroy the bearings.

In order to produce the desired vibratory effect, the vibratory shaft must carry an offset outwardly extending weight. The level of oil in any oil sump must be at all times below the vibratory shaft and its offset weight in order to prevent foaming of the oil with commensurate loss of lubricative qualifies, and in order to prevent heating of the oil with its commensurate wasted energy losses.

It is known, in connection with the lubrication of differential mechanisms such as are employed in vehicle final drives, to supply oil to the carrier of the differential mechanism near its axis of rotation so that the centrifugal forces may be utilized to urge the oil to flow radially outwardly through passages in the carrier, directing the oil to the carrier's internal components, in situations where the carrier is normally operated at relatively high rotative speeds. It is also known, where the carrier is to be normally operated at relatively low rotative speeds to provide scooops or cups around the carrier to lift the oil upward as the carrier rotates so that it may drain radially inward by gravity through passages of the carrier directing the flow to the carrier's internal components. Structures have also been devised to utilized the centrifugal forces when the carrier is operating at high rotative speeds and to use the gravitational forces when the same carrier is moving at low rotative speeds. See U.S. Pat. No. 3,741,343 granted to Lindenfeld et al in June of 1973.

This structure, however, does not suggest a means of providing positive lubrication to the bearings of a shaft moving at high rotative speeds concentric with another member moving at low rotative speeds and including the housing for said bearings.

The patent to Fekete et al, U.S. Pat. No. 1,787,428, granted in January of 1931, shows a structure in which gears affixed to a shaft in a gear casing dip into the oil or lubricant in the bottom of the casing thereby suitably lubricating the faces of the gears. The lubricant is thrown from the gears and splashed upon the walls of the casing, and runs down to a position where it is led onto the bearings. This method is not suitable for providing adequate and positive lubrication; and is somewhat similar to the system the present invention was designed to replace.

The patent to Williams, U.S. Pat. No. 3,301,349, granted in January of 1967, and the patent to Planch, U.S. Pat. No. 1,766,001, like the two patents listed above were located on a search of the prior art relative to the present invention. The Williams and Planch patents are also both related to splash type systems which the system of the present invention is designed to replace.

Applicant and those in privity with him know of no closer prior art than that set out above, and know of no prior art which anticipates the claims presented herewith.

BRIEF SUMMARY OF THE INVENTION

A bearing is mounted in a housing and a substantially horizontal shaft is rotatably mounted in the bearing. An oil reservoir is situated to come in contact with and to innundate a lower portion of the bearing housing, but the upper level of the oil is maintained below the rotatable shaft and any appurtenances rotating with it. The bearing housing can be rotated independently of the rotation of the shaft at a speed such that oil on or in the bearing housing will flow downwardly under the influence of gravity rather than outwardly due to centrifugal force. Means is provided to rotate the horizontal shaft independently with respect to the rotation of the bearing housing.

At least one pocket is provided in the bearing housing extending radially outwardly from the bearing. Each pocket is provided with an oil access port open through the bearing housing spaced from the radially outermost edge of the pocket, and positioned to lie beneath the level of oil in the reservoir when passing vertically below the axis of the shaft. An oil delivery port is provided at an edge of said pocket closest to the center of rotation of the bearing and shaft, the delivery port being open through the bearing housing from the pocket to deliver oil to the bearing as the delivery port approaches and passes vertically above the axis of rotation of the bearing housing and the shaft.

In the form of the invention shown, the horizontal rotating shaft is a vibratory shaft supported at each end by a vibratory shaft bearing, each bearing being supported in a bearing housing which is mounted to rotate with rotation of a rotating drum of a road roller or earth compacting machine.

IN THE DRAWINGS

FIG. 1 is a side elevational view of an articulated earth compacting machine having double vibrating drums each rotatably supported for relatively slow rotation with respect to the machine and each supporting a rotating higher speed vibratory shaft in concentric relationship with respect to its own axis of rotation;

FIG. 3 is a further enlarged fragmentary vertical sectional view taken on the line 3—3 in FIG. 1;

FIG. 4 is a vertical sectional view taken on the line 4—4 in FIG. 2 and in FIG. 5; and FIG. 5 is a transverse sectional view taken on the line 5—5 in FIG. 4.

DESCRIPTION OF PREFERRED EMBODIMENT

Figure 2:
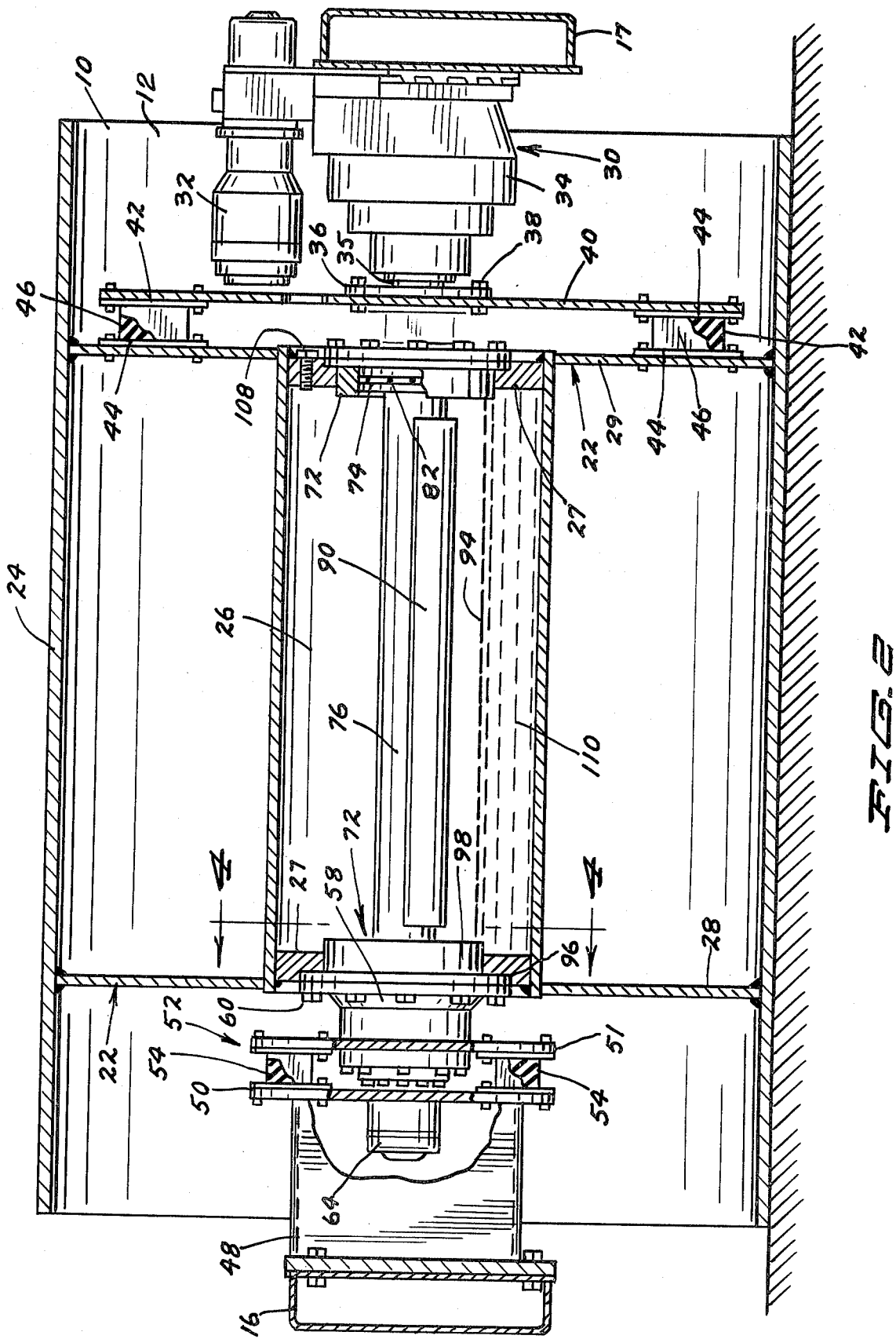
FIG. 2 is an enlarged vertical sectional view taken on the line 2—2 in FIG. 1.

A double drum articulated earth compacting machine 10 includes a front drum 12 and a rear drum 14 rotatably mounted between front, parallel, spaced apart, side frame members 16 and 17 and rear, parallel, spaced apart, side frame members 18 and 19, respectively, of an articulated main frame 20 of the compacting machine 10. The drums can be identical in structure, so only one of the drums, arbitrarily designated as front drum 12, will be described in detail.

The drums each consist of a main drum weldment 22 having an outer cylindrical ground-contacting shell 24, an inner cylindrical oil sump 26 concentric with the shell 24, a pair of disc shape transversely extending drum end plates 28 and 29 integrally connected between the outer shell 24 and the periphery of oil sump 26, and a pair of oil sump end plates 27,27. At the right side of the drum 12 as seen in FIG. 2, a front propel motor assembly 30 is integrally connected to the right front side frame member 17 and includes hydraulic propel motor 32 and a propel gear box 34. Fastened on a propeller shaft 35 extending outwardly from the gear box 34 is a rotatable propel drive plate 36 which, when the propel motor 32 is appropriately activated, can be rotated forward or backward at between 20 to 30 revolutions per minute, for example.

Drive plate 36 is bolted as at 38 to a drum support plate 40. This drum support plate is, in turn, connected to the drum end plate 29 through the instrumentality of rubber shock mounts 42. As shown, these shock mounts 42 include steel base plates 44,44 firmly bonded to a rubber shock absorbing block 46, but any other shock absorbing mounting sufficient to carry the load and dampen the shocks will suffice.

On the left side of the drum 12 as seen in FIG. 2, a drum support weldment 48 extends integrally inwardly from the front side frame member 16 and includes a drum support plate 50 fixedly mounted with respect to the frame member 16. This drum support plate is connected to a vibratory drum support plate 51 of a vibratory shaft drive and drum support assembly 52 through the instrumentality of rubber shock mounts 54. These mounts can be similar in construction to rubber shock mounts 42 or can be of any other usual or preferred construction.

The vibratory shaft drive and drum support assembly 52 houses a main drum support bearing 56 which, in turn, rotatably supports a main drum hub 58 which is bolted to the main drum weldment 22 at oil sump end plate 27 by bolts 60. This structure allows the drum 12 to support the left front side frame member 16 while at rest or rotating relatively slowly with respect to it under motion imparted by and through the propel motor assembly 30.

Also bolted to the vibratory shaft drive and drum support assembly 52 as at 62 is a hydraulic vibratory motor 64 and its integral vibratory motor mounting plate 66. Vibratory motor 64 includes a vibratory motor drive shaft 68 which extends through a suitable coupling 69 to end in a vibratory motor drive cap 70.

In addition to holding the main drum hub 58 in fixed relationship with respect to the oil sump end plate 27 of the main drum weldment 22, the bolts 60 also fixedly position a combined vibratory shaft bearing housing and oil transfer fitting 72 in concentric relationship with respect to the axis of the drum 12 and the vibratory motor drive cap 70.

An outer race 80 of a vibratory shaft bearing 74 is fixedly mounted in the housing 72 in adjacent relation to the main drum hub 58; and an inner race 86 of bearing 74 supports one end of a vibratory shaft 76 for rotation with respect to the outer race and the main drum hub 58. This end of shaft 76 is bolted to the vibratory motor drive cap 70 by bolts 78.

At the right end of vibratory shaft 76 as seen in FIG. 2, another vibratory shaft bearing housing and oil transfer fitting 72 is fastened to its oil sump end plate 27 of the main drum weldment 22, and this vibratory bearing housing and oil transfer fitting 72 similarly supports a vibratory shaft bearing 74 which in turn supports the vibratory shaft 76. The bearing housing and oil transfer fitting 72 at the right in FIG. 2 acts in a similar manner to that of the fitting 72 on the left in FIG. 2 to positively supply lubricating oil to its bearing 74 in a manner now to be described.

The outer race 80 of each of the vibratory shaft bearings 74 is provided with a plurality of oil access holes 82 leading through the outer race 80 to bearing rollers 84 running between the bearing races 80 and 86. Outer race 80 is also provided with a lubricating channel 88 to distribute oil reaching it to all of the oil access holes 82 and thus to the rollers 84, insuring positive lubrication of the bearing 74.

The vibratory shaft 76 is provided with an offset weight 90 affixed to it. One of the oil sump end plates 27 (the right end plate as seen in FIG. 2) is provided with a threaded opening to receive a threaded magnetic filler plug 108 which can be removed to permit introduction of lubricating oil 110 into the oil sump 26 up to a line indicated at 94 in FIGS. 2 through 5.

Vibratory shaft bearing housing and oil transfer fitting 72 includes a radially outwardly extending flange 96 through which bolts 60 extend to fasten it and the main bearing hub 58 to end plate 27 of main drum weldment 22; and also includes vibratory bearing housing receiving hub 98 situated back to back with the main drum hub 58. The bearing housing receiving hub 98 is provided with a bearing retaining lip 100, and the outer race 80 of the vibratory shaft bearing 74 is fixedly held between the main drum hub 58 and this retaining lip 100.

The hub 98 of fitting 72 is provided with a series of wedge shape pockets 102. Each such pocket is open to the interior of the oil sump 26 through an access port 104 in the hub 98, and each such pocket is open to the lubricating channel 88 in outer race 80 of vibratory shaft bearing 74 through an oil delivery port 106 in the hub 98.

It is often advantageous to apply a vibratory action to the outer shell 24 of each of the drums 12 and 14 at a rapid rate. For example, in a typical case, the hydraulic vibratory motor 64 can be operated to rotate the vibratory motor drive shaft 68 and, therefore, the vibratory shaft 76 at, say, for example, 2300 revolutions per minute.

When the earth compacting machine 10 is being moved from place to place under its own power, or at other times when vibratory action is not desirable, the vibratory motor will be inoperative, and the vibratory shaft 76 will have no relative motion with respect to the drum support weldment 48.

In other situations, the main drums will be rotated very, very slowly or will be stopped while the full speed vibratory action is continued.

In each of these situations, it is imperative that sufficient oil be supplied to the bearing rollers 84 of the vibratory shaft bearings 74 at each end of the vibratory shaft. This is positively accomplished using the apparatus of the invention.

OPERATION

Sufficient lubrication oil 110 suitable for lubricating the bearings 74,74 is introduced into the oil sump 26 to bring the upper surface of the oil to the line indicated at 94. This oil level is maintained below the lowest level reached by the offset weight 90 as it rotates in the oil sump. This prevents heating and foaming of the oil.

As perhaps best seen in FIGS. 3, 4 and 5, the oil 110 will enter each pocket 102 as its access port 104 moves below the upper surface 94 of the oil. As the main drum weldment 22 rotates, for example, in clockwise direction as seen in FIG. 4, some of the oil in the pocket will tend to flow back out through the access port, but since the access port is above the "bottom" of the pocket at this point, a considerable body of oil will remain as at 111 in the pocket until such time as the oil delivery port 106 begins to become upright. (See FIG. 4). At this point, the oil 110 will flow out of the delivery port 106 into the lubricating channel 88 around the outer race 80 of the vibratory shaft bearing 74.

There is no purpose in maintaining vibratory action when the compacting machine is completely at rest. In this situation, when the propel motor is not driving the drums, the vibratory motor will not be driving the vibratory shaft 76, and no lubrication to vibratory shaft bearing 74 will be needed.

When the main drum weldment is driven in reverse direction, the action of the oil in the sump 26, bearing housing and oil transfer fitting 72 and bearing 74 will be as described above but with the drum weldment 22 rotating in counter-clockwise direction as seen in FIG. 4.

When there is even the slightest movement of the propel motor and consequently of the drums 12 and 14, there will be a positive feeding of oil to the vibratory shaft bearings 74,74 in the manner set out above whether the vibratory shaft is turning or not.

The embodiments of the invention in which an exclusive property or privilege is claimed are defined as follows:

1. In a structure including a frame, a first rotatable member supported to rotate with respect to said frame on a substantially horizontal axis, and a second rotatable member supported to rotate with respect to said first member in concentric relation to said horizontal axis, the improvement including:

A. a first rotatable member;
   B. means to rotatably support at least one end of said member with respect to said frame to rotate on a substantially horizontal axis;
   C. a second rotatable member;
   D. at least one bearing housing fixedly and concentrically mounted with respect to said first rotatable member to rotate with that member, said housing being defined partially by a face extending generally radially outwardly from said horizontal axis;
   E. a first bearing mounted in each such bearing housing and rotatably supporting said second rotatable member for rotation with respect to said first rotatable member and with respect to said frame in concentric relation to said horizontal axis;
   F. first means to rotate said first rotatable member with respect to said frame;
   G. second means to rotate said second rotatable member with respect to said frame;
   H. a lubrication oil sump circumscribing said second rotatable member and said bearing housing and mounted to rotate with said first rotatable member;
   I. lubrication oil in said sump at a sufficient depth to inundate at least a substantial portion of said bearing housing lying vertically below the horizontal axis of rotation; and
   J. said bearing housing being provided with:
      (1) at least one internal pocket extending generally radially outwardly from said first bearing,
      (2) an oil access port open from the pocket through said face of said bearing housing in spaced relation to the radially outermost edge of the pocket and positioned to lie below the surface of the oil in said sump when passing vertically below the axis of rotation, and
      (3) an oil delivery port open through the bearing housing from the edge of the pocket adjacent the first bearing in position to deliver oil to said first bearing as the delivery port approaches and passes vertically above the axis of rotation.

2. The structure of claim 1 wherein:
   K. said first rotatable member is constituted as a hollow drum and first and second means are provided to rotatably support first and second end portions of said drum member with respect to said frame;
   L. said second rotatable member is constituted as a shaft;
   M. two bearing housings are fixedly and concentrically mounted with respect to opposite end portions of said drum member;
   N. said oil sump is cylindrical and is fixedly mounted with respect to said drum member to encompass the entire rotatable shaft and both bearing housings;
   O. said oil in said sump is at a level below said rotatable shaft and any appurtenances connected to the shaft; and
   P. each of said bearing housings is provided with a plurality of internal pockets, oil access ports and oil delivery ports.

3. The structure of claim 2 wherein:
   Q. each of said bearings in said bearing housings include an outer race fixedly mounted in its bearing housing, an inner race fastened to rotate with said rotatable shaft, and anti-friction rollers running in said races; and
   R. each of said outer bearing races include oil access holes open from positions in transverse alignment with said housing oil delivery ports to the interior of the outer race to deliver oil to the working surfaces of said races and to said bearing rollers.

4. The structure of claim 3 wherein:
S. said outer bearing races are also each provided with a ring-like lubricating channel in transverse alignment with said housing oil delivery ports and said outer bearing race access holes to provide a passage for oil from said delivery ports through said access holes.

5. The structure of claim 3 wherein:
S. said rotatable shaft is provided with an offset weight attached to rotate with it and said oil level in said sump is maintained below said shaft and weight.

6. The structure of claim 3 wherein:
S. said first means to rotatably support said first end portion of said drum member includes:
  (1) a main drum hub fixedly and concentrically mounted with respect to said drum member,
  (2) a drum support assembly fixedly mounted to said frame, and
  (3) a main drum support bearing having an outer race supported in said drum support assembly in concentric relation to said horizontal axis, an inner race fixedly mounted with respect to the main drum hub, and bearing rollers rolling in said races;
T. said second means to rotate said second rotatable member or shaft includes a shaft drive motor fixedly mounted with respect to said drum support assembly and having a drive shaft extending through said drum support assembly and said main drum hub in concentric alignment and driving relationship to an adjacent end portion of said rotatable shaft.

7. The structure of claim 1, 2, 3, 4, or 5 wherein said first means to rotate said first rotatable member with respect to the frame is effective to rotate said first rotatable member no faster than the highest speed that will permit said oil to flow down by gravity through said oil delivery port to said first bearing.

* * * * *